US012343894B2

(12) United States Patent
Aguilar et al.

(10) Patent No.: US 12,343,894 B2
(45) Date of Patent: Jul. 1, 2025

(54) VIBRATORY CUTTING APPARATUS AND METHOD COMPRISING FLUID BEARINGS

(71) Applicant: CORNING INCORPORATED, Corning, NY (US)

(72) Inventors: Alejandro Aguilar, Painted Post, NY (US); Kevin Eugene Elliott, Horseheads, NY (US); Justin Carl Fossum, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 422 days.

(21) Appl. No.: 17/798,441

(22) PCT Filed: Feb. 11, 2021

(86) PCT No.: PCT/US2021/017569
§ 371 (c)(1),
(2) Date: Aug. 9, 2022

(87) PCT Pub. No.: WO2021/167828
PCT Pub. Date: Aug. 26, 2021

(65) Prior Publication Data

US 2023/0076703 A1 Mar. 9, 2023

Related U.S. Application Data

(60) Provisional application No. 62/977,458, filed on Feb. 17, 2020.

(51) Int. Cl.
*B26D 7/08* (2006.01)
*B26D 1/06* (2006.01)
(Continued)

(52) U.S. Cl.
CPC ............... *B26D 7/086* (2013.01); *B26D 1/06* (2013.01); *B26D 7/0006* (2013.01); *B28B 11/16* (2013.01); *B26D 2210/00* (2013.01)

(58) Field of Classification Search
CPC ........ B26D 7/086; B26D 1/06; B26D 7/0006; B26D 2210/00; B26D 3/16; B26D 1/08;
(Continued)

(56) References Cited

U.S. PATENT DOCUMENTS 3,557,848 A * 1/1971 Wright .................... B27B 33/06 83/820
3,674,065 A * 7/1972 Fairfield, Jr. .......... B23D 59/02 83/13
(Continued)

FOREIGN PATENT DOCUMENTS

EP 2754540 A1 7/2014
JP 11-113921 A 4/1999

OTHER PUBLICATIONS

International Search Report and Written Opinion of the International Searching Authority; PCT/US21/17569; Mailed May 31, 2020; 10 Pages; European Patent Office.

*Primary Examiner* — Ghassem Alie
(74) *Attorney, Agent, or Firm* — Kevin M. Able

(57) ABSTRACT

A system and method for vibratory cutting, including in the manufacture of ceramic honeycomb bodies. The apparatus includes a transducer configured to generate vibrations with respect to an axial direction. A cutting element is configured to receive and oscillate axially in response to the vibrations. The cutting element has a blade having a width, an axial length, and a thickness. A cutting plane of the blade is defined with respect to the width and the axial length. The blade has opposing side surfaces that extend parallel to the cutting plane. The thickness extends perpendicular to the cutting plane between the opposing side surfaces. A set of fluid bearings are configured to exert fluid pressure on each of the opposing side surfaces to constrain vibrations of the blade oriented in directions transverse to the cutting plane.

19 Claims, 14 Drawing Sheets

(51) Int. Cl.
*B26D 7/00* (2006.01)
*B28B 11/16* (2006.01)

(58) Field of Classification Search
CPC ..... B26D 55/084; B28B 11/16; B28B 11/163; A61B 18/1477; A61B 2018/00196; A61B 2218/007; A61B 2218/00577; A61B 2018/162; A61B 2018/1425; H02J 50/10; H02J 2310/23; Y01T 83/089; B28D 1/02; B28D 5/047; B28D 5/0064; B28D 5/045; B23D 59/02
USPC .... 83/701, 62.1, 820, 62, 35, 177, 367, 368, 83/491, 666, 956, 22, 171, 821, 169, 827, 83/824, 829; 125/2, 15; 451/7, 53, 165
See application file for complete search history.

(56) References Cited

U.S. PATENT DOCUMENTS

| | | | | | |
|---|---|---|---|---|---|
| 4,715,254 | A * | 12/1987 | DeGan | B23D 59/02 | 83/171 |
| 5,497,684 | A * | 3/1996 | Martin | B23D 47/005 | 83/13 |
| 7,228,855 | B2 * | 6/2007 | Yamasaki | B23D 55/084 | 125/21 |
| 2015/0047622 | A1 * | 2/2015 | Toba | B26D 3/16 | 125/12 |
| 2015/0298335 | A1 | 10/2015 | Perron et al. | | |

* cited by examiner

VIBRATORY CUTTING APPARATUS AND METHOD COMPRISING FLUID BEARINGS

CROSS REFERENCE TO RELATED APPLICATIONS

This is a national stage application under 35 U.S.C. § 371 of International Application No. PCT/US2021/017569, filed on Feb. 11, 2021, which claims the benefit of priority under 35 U.S.C. § 119 of U.S. Provisional Application Ser. No. 62/977,458 filed on Feb. 17, 2020, the content of which is relied upon and incorporated herein by reference in their entireties.

BACKGROUND

This disclosure relates to cutting methods and apparatuses, and more particularly, vibratory cutting methods and apparatuses.

Workpieces must be cut in a variety of industries, such as the ceramic honeycomb manufacturing industry.

SUMMARY

Disclosed herein according to some embodiments is a vibratory cutting apparatus comprising: a transducer configured to generate vibrations with respect to an axial direction; a cutting element configured to receive and oscillate axially in response to the vibrations, the cutting element comprising a blade having a width, an axial length, and a thickness, wherein a cutting plane of the blade is defined with respect to the width and the axial length, the blade comprises opposing side surfaces that extend parallel to the cutting plane, and the thickness extends perpendicular to the cutting plane between the opposing side surfaces; and a set of fluid bearings configured to exert fluid pressure on each of the opposing side surfaces to constrain vibrations of the blade oriented in directions transverse to the cutting plane.

In some embodiments, the fluid bearings comprise non-contact fluid static bearings.

In some embodiments, a cutting edge of the blade extends along an entirety of the width of the blade.

In some embodiments, the cutting element comprises a horn coupled to the transducer and configured to amplify the vibrations in the axial direction, wherein the blade extends in the axial direction from the horn.

In some embodiments, the apparatus further comprises an actuator configured to move the cutting element through a cutting stroke in the axial direction.

In some embodiments, the cutting element is moved relative to the set of fluid bearings to traverse through the cutting stroke.

In some embodiments, a pressure area on each of the opposing side surfaces, in which the set of fluid bearings exert fluid pressure, extends across an entirety of the width of the blade.

In some embodiments, the fluid bearings exert the fluid pressure in an area on each of the opposing side surfaces, and the area has a shape that comprises a cutout to accommodate at least a portion of an outer peripheral shape of a workpiece.

In some embodiments, the cutout is configured to circumscribe an entirety of the outer peripheral shape of the workpiece.

In some embodiments, the blade comprises a pair of flanges extending perpendicular to the cutting plane and along the axial length of the blade, and wherein the set of fluid bearings are further configured to exert the fluid pressure against opposing flanges to put the blade in tension in a widthwise direction.

In some embodiments, the apparatus further comprises one or more pairs of auxiliary bearings configured to exert a pressure against the opposing side surfaces of the blade.

In some embodiments, the auxiliary bearings are configured to temporarily exert the pressure against the opposing side surfaces and then move away from the cutting element during travel of the cutting element in the axial direction.

In some embodiments, the auxiliary bearings are configured to axially retract toward and extend away from the fluid bearings while exerting the pressure on the opposing side surfaces during travel of the cutting element in the axial direction.

In some embodiments, the auxiliary bearings comprise fluid bearings, mechanical bearings, or both.

In some embodiments, the axial length is at least 10 inches and the thickness is less than 0.125 inches.

In some embodiments, the axial length is from 11 inches to 15 inches and the thickness is from 0.01 inches to 0.006 inches.

Disclosed herein according to some embodiments is an extruder system comprising the vibratory cutting apparatus of claim 1; and an extrusion die configured to extrude an extrudate from a batch mixture; wherein the vibratory cutting apparatus is positioned relative to the extrusion die to cut the extrudate into green bodies.

In some embodiments, the extrusion die is a honeycomb extrusion die, the batch mixture is a ceramic-forming mixture, and the green bodies are green ceramic bodies.

Disclosed herein according to some embodiments is a method of cutting of a workpiece, comprising vibrating a blade of a vibratory cutting apparatus with respect to an axial direction; moving the blade through a cutting stroke in the axial direction through the workpiece while vibrating; and exerting a fluid static pressure on opposing side surfaces of the blade to stiffen the blade as the blade moves through the cutting stroke.

In some embodiments, the fluid static pressure is exerted by a set of non-contact fluid static bearings.

In some embodiments, the blade is moved relative to the set of non-contact fluid static bearings to traverse through the cutting stroke.

In some embodiments, the fluid static bearings comprise a cutout corresponding to at least a portion of an outer peripheral shape of the workpiece, and the method further comprises, before moving the blade in the cutting stroke, positioning the workpiece in the cutout.

In some embodiments, the cutout circumscribes an entirety of the outer peripheral shape of the workpiece.

In some embodiments, the vibrating comprises generating vibrations with a transducer of the vibratory cutting apparatus and transmitting the vibrations to the blade.

In some embodiments, moving the blade through the cutting stroke comprises actuating an actuator to move the blade.

In some embodiments, the apparatus further comprises temporarily exerting a pressure against the opposing side surfaces with one or more pairs of auxiliary bearings, and then moving the auxiliary bearings away from the blade while the blade is moved through the cutting stroke.

In some embodiments, the apparatus further comprises exerting a pressure against the opposing side surfaces with one or more pairs of auxiliary bearings, wherein the one or more pairs of auxiliary bearings are axially retracted toward and extended away from the fluid bearings while the blade is moved through the cutting stroke.

In some embodiments, the blade has axial length of at least 10 inches and a thickness of less than 0.125 inches.

In some embodiments, the blade has axial length from 11 inches to 15 inches and a thickness from 0.01 inches to 0.006 inches.

Disclosed herein according to some embodiments is a method of manufacturing a ceramic honeycomb body comprising extruding a ceramic-forming mixture through a honeycomb extrusion die to form a honeycomb extrudate; and cutting a workpiece formed from the honeycomb extrudate to form a green honeycomb body; wherein cutting the green honeycomb body comprises: vibrating a blade of the vibratory cutting apparatus with respect to an axial direction; moving the cutting element through a cutting stroke in the axial direction while vibrating; and exerting a fluid static pressure on opposing side surfaces of the blade to stiffen the blade as the blade moves through the cutting stroke.

In some embodiments, the workpiece is the honeycomb extrudate or a log previously cut from the honeycomb extrudate.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
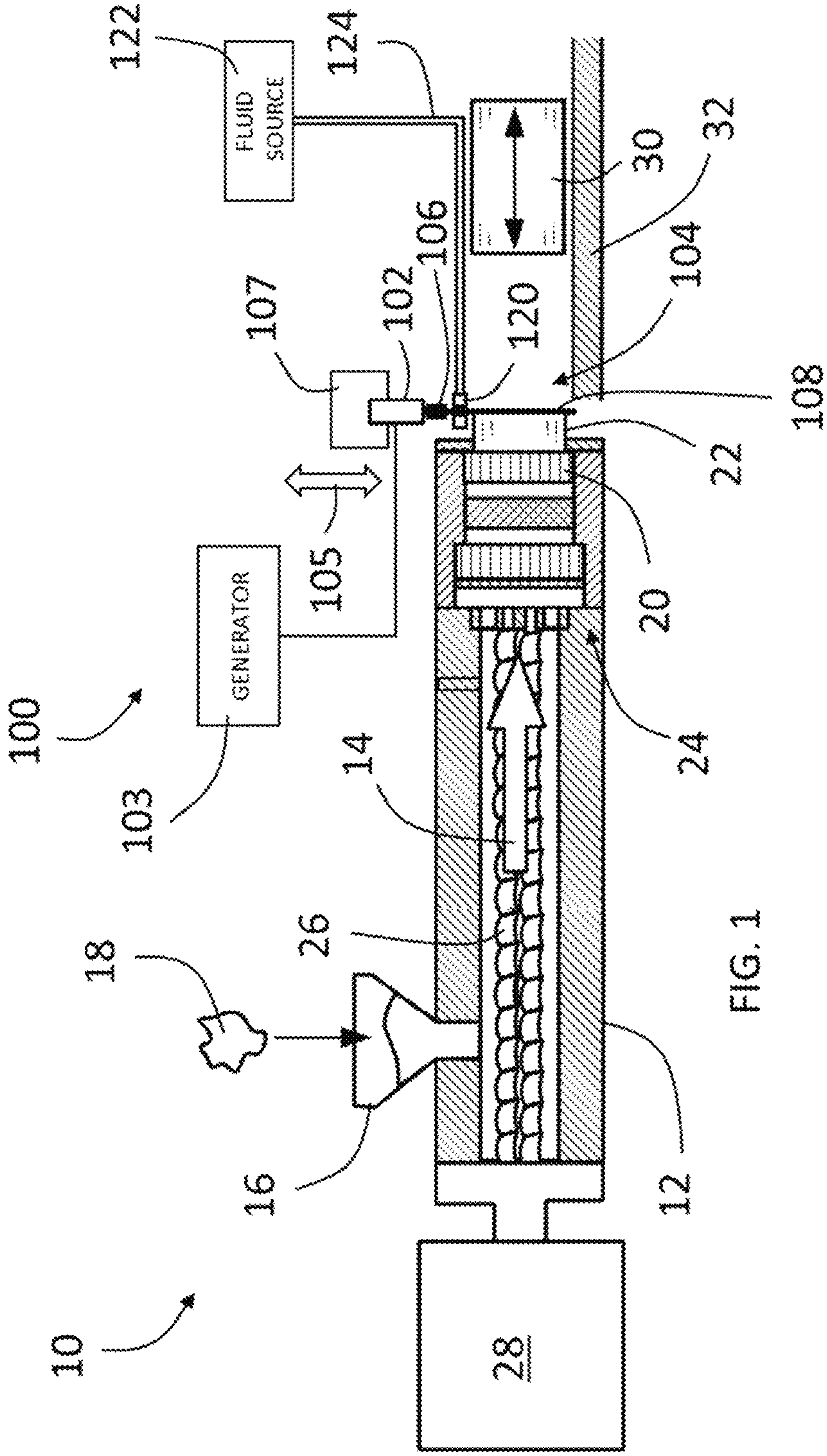
FIG. 1 is a schematic cross-sectional side view of an extruding system comprising a vibratory cutting apparatus according to some embodiments disclosed herein.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

A vibratory cutting apparatus produces vibrations to assist in the cutting operation performed by a cutting element of the apparatus. The vibrations can be communicated to a cutting blade as oscillations of the cutting blade with respect to an axial direction, which may also be the cutting direction of the blade. In some scenarios, particularly those that require precise and/or thin cuts, the thickness of the blade should be considered since this dimension affects the amount of kerf (e.g., amount of material removed and/or thickness of the cut), in a cutting process. The axial length of the blade should also be considered since the blade must be sufficient in size to cut through the corresponding dimension of the workpiece being cut. For example, unlike a traditional knife, a vibratory cutting element may require a horn portion, a transducer, or other components at the axial end of the cutting blade opposite the cutting edge, which would interfere with cutting if the length of the blade is too short. However, as the axial length is increased and/or the thickness is decreased, the blade becomes increasingly subject to vibrations that are in directions transverse to the cutting plane of the blade (i.e., "out of plane" vibrations). Such out of plane vibrations may result in poorer cut quality, e.g., wider and/or rougher (less precise) cuts.

In various embodiments, an extrusion system, or extruder, comprises a vibratory cutting apparatus for cutting a workpiece such as an extrudate or green body log into green bodies of one or more target lengths. Advantageously, the vibratory cutting apparatuses and methods disclosed herein result in precise, thin cuts suitable for materials, such as green bodies extruded from ceramic-forming mixtures, which have low moduli of elasticity (exhibit high degrees of plastic deformation). Additionally, the vibratory cutting apparatuses and methods disclosed herein advantageously enable the use of both thinner and axially longer cutting blades for vibratory cutting apparatuses while maintaining cut precision and quality. For example, extruder systems comprising honeycomb extrusion dies can be used to mix and extrude a ceramic-forming mixture (batch mixture) to produce honeycomb extrudate that is cut into honeycomb green bodies, which are then dried and fired to form ceramic honeycomb bodies.

As described herein, as thickness is reduced and/or as the axial length is increased, the out of plane vibrations become more prominent, e.g., dissipating increasing amounts of axially-directed vibrational energy. For example, blades having longer lengths and/or thinner thicknesses with have first axial resonance modes that come later than blades having shorter lengths or greater thicknesses. Consequently, the axial vibration input can be lost to any or several of the non-axial (out of plane) modes. As the number for the first axial resonance mode is increased, the out of plane vibrations become more prominent. Due to the increased prominence of the out of plane vibrations, an unstiffened blade that is overly long and/or overly thin may become damaged or even destroyed when subjected to vibrational energy from a transducer. Advantageously according to embodiments disclosed herein, the current embodiments enable blades having an axial length longer than 10 inches (25.4 cm) and a thickness less than ⅛ inch (0.125 inch, 3.175 mm).

According to embodiments herein, the axial dynamic stiffness of a cutting blade of a vibratory cutting apparatus is increased by introducing non-contact fluid bearings on opposing front and back side of the blade. By adding this non-contact bearings, the axial dynamic stiffness of the blade is increased and the out of plane vibration is constrained. That is, the axial stiffness of the blade is increased as the blade is moved axially during cutting. Advantageously, the increase in axial stiffness and corresponding decrease in out of plane vibrations enables the use of thinner blades, longer blades, and cleaner cuts, which in turn enables larger workpieces and/or workpieces of varying properties (such as those that have low moduli of elasticity and thereby exhibit high plastic deformation) to be cut while maintaining precision of the cuts. By improving the quality of the cut, subsequent manufacturing processes to clean up the cut can be reduced or avoided entirely, while still ensuring dimensional accuracy of the cut pieces. Accordingly, the apparatuses and methods herein can assist in improving material utilization, reducing waste, improving manufacturing time, improving dimensional accuracy, and reducing cost.

An extruding system (or extruder) 10 is illustrated in FIG. 1. The extruder 10 comprises a barrel 12. For example, the barrel 12 can be monolithic or it can be formed from a plurality of barrel segments connected successively in the longitudinal (e.g., extrusion) direction 14 as depicted by the directional arrow shown. The one or more chamber portions extend through the barrel 12 in the longitudinal direction 14 between an upstream side and a downstream side of the extruder 10. At the upstream side, a material supply port 16, which can comprise a hopper or other material supply structure, can be provided to supply a ceramic-forming mixture (or batch mixture) 18 into the extruder 10.

An extrusion die 20 is coupled at the downstream side of the barrel 14 to extrude the batch mixture 18 into a desired shape for extrudate 22 produced by the extruder 10. For example, the extrusion die 20 can be a honeycomb extrusion die for producing the extrudate 22 as green honeycomb extrudate. The extrusion die 20 can be coupled to the barrel 12 by any suitable means, such as bolting, clamping, or the like. The extrusion die 20 can be preceded by other extruder structures in an extrusion assembly 24, such as a generally open cavity, a particle screen, screen support, a homogenizer, or the like to facilitate the formation of suitable flow characteristics, e.g., a steady plug-type flow front before the batch mixture 18 reaches the extrusion die 20.

The ceramic-forming mixture 18 can be introduced to the extruder 10 continuously or intermittently. The ceramic-forming mixture 18 can comprise one or more inorganic materials (e.g., alumina, silica), binders (e.g., methylcellulose), pore formers (e.g., starch, graphite, resins), a liquid vehicle (e.g., water), sintering aids, or any other additives helpful in the manufacture of the final ceramic honeycomb body manufactured by use of the extruder 10. The inorganic materials in the ceramic-forming mixture 18 can be selected such that the final ceramic honeycomb body (e.g., created by cutting, drying, and firing honeycomb extrudate 22 extruded by the extruder 10) can comprise phases of cordierite, aluminum titanate, alumina, mullite, silicon carbide, and/or other ceramic materials, or combinations thereof.

As shown in FIG. 1, a pair of extruder screws 26 are mounted in the barrel 12. The pair of extruder screws 26 can be rotatably mounted be arranged generally parallel to each other. The pair of extruder screws 26 can be coupled to a driving mechanism 28, e.g., located outside of the barrel 12 for rotation in the same or different directions. The pair of extruder screws 26 can be coupled to a single driving mechanism (as shown) or optionally to individual driving mechanisms. The pair of extruder screws 26 can operate to move the batch mixture 18 through the barrel 12 with pumping and mixing action in the longitudinal direction 14, which also corresponds to the extrusion direction. Other mixing and pressurizing elements can be used in lieu of the extruder screws 26, such as a hydraulic ram extrusion press, or any other suitable extruder mechanism.

Figure 3:
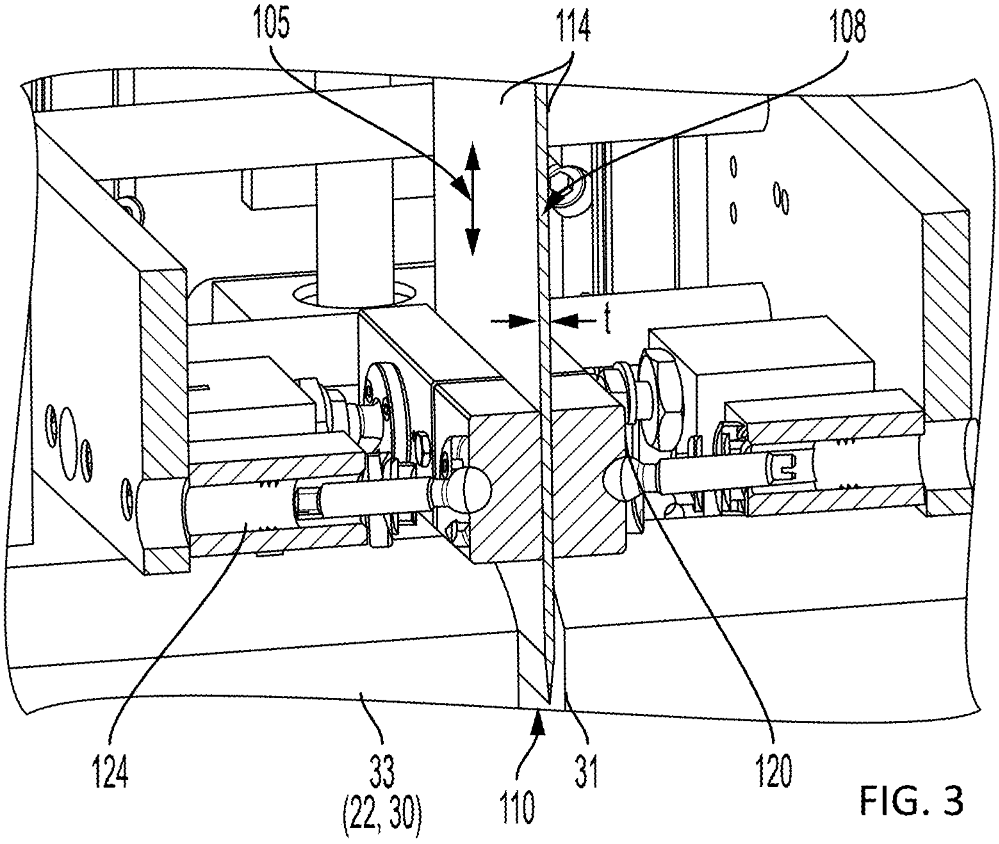
FIG. 3 is a schematic cross-sectional side view of a portion of a vibratory cutting apparatus according to some embodiment disclosed herein.

The extruder 10 further comprises a vibratory cutting apparatus 100. For example, as described in more detail below, the vibratory cutting apparatus 100 is configured to cut a workpiece (e.g., form a cut 31 in a workpiece 33 such as the extrudate 22 and/or a green body 30 as shown in FIG. 3 and described further with respect to FIG. 1). More particularly, as illustrated in FIG. 1, the vibratory cutting apparatus 100 can be implemented to cut, sever, or otherwise separate lengths or portions from the extrudate 22 in the form of the green bodies 30. In some embodiments, the green bodies 30 are "logs", which are subsequently cut into multiple green bodies of shorter lengths. In this way, the vibratory cutting apparatus 100 (or multiple of the vibratory cutting apparatuses 100) can be used to cut green bodies from extrudate (e.g., green bodies 30 from extrudate 22), or to cut shorter green bodies from an initially longer green body (e.g., to cut green bodies of a target or desired length from a log), or a combination of both.

The workpiece cut by the cutting apparatus 100 can comprise the extrudate 22 (e.g., directly from the extruder), or the green body 30 (e.g., that has previously been severed from the extrudate 22, such as by an instance of the vibratory cutting apparatus 100 or by other cutting mechanism). For example, multiples of the vibratory cutting apparatuses 100 can be included in sequence to progressively cut green bodies to shorter lengths. In some embodiments, the vibratory cutting apparatus 100 is paired with (e.g., positioned downstream or upstream of) another cutting mechanism (e.g., a saw, laser, wire, or other cutting tool), such that the vibratory cutting apparatus 100 performs at least one cutting process and the other cutting mechanism performs at least one other cutting process.

After cutting, the resulting green bodies 30 can be subjected to further manufacturing steps, such as drying, firing, and/or inspection. For example, the green bodies 30 can be positioned on a conveyance device 32 before, during, and/or after cutting by the vibratory cutting apparatus 100. For example, the conveyance device 32 can comprise a conveyor, an air bearing, a tray, a rail, a carriage, a robotic gripper hand or arm, or combinations of these or other suitable transportation devices.

Figure 2:
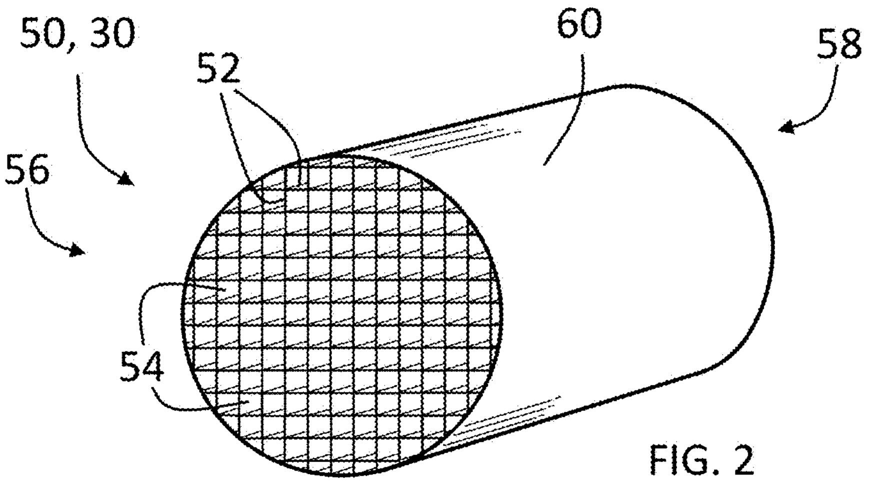
FIG. 2 illustrates a honeycomb body that can be cut using vibratory cutting apparatus according to some embodiments disclosed herein.

An example of a honeycomb body 50 is illustrated in FIG. 2. The honeycomb body 50 is one example structure for the green bodies 30, of a workpiece that can be cut by the vibratory cutting apparatus 100, and/or of a ceramic honeycomb body that results from firing one of the green bodies 30. That is, the cross-sectional configuration of the extrusion die 20, the extrudate 22, the green bodies 30, and the ceramic honeycomb bodies resulting from firing the green bodies 30 all correspond to each other, since the configuration is provided by the extrusion die is substantially retained (e.g., subject to some degree of shrinkage and/or growth) during cutting, drying, and firing of the ceramic honeycomb bodies. The honeycomb body 50 comprises intersecting walls 52 that form a plurality of channels 54. The channels 54 extend axially through the honeycomb body 50 and can be parallel to one another so as to extend from a first end 56 to a second end 58. A skin 60 can be formed on an outside peripheral surface of the green honeycomb body 50.

The honeycomb body 50 can be utilized in a variety of applications, such as for use in a catalytic converter (e.g., the walls 52 acting as a substrate to be loaded with a catalytic material) and/or a particulate filter (e.g., in which some of the channels 54 are plugged at the first end 56 and/or the second end 58, such as alternatingly at the opposite ends 56, 58). Such honeycomb bodies 50 can thus assist in the treatment or abatement of pollutants from a fluid stream, such as the removal of undesired components from the exhaust stream of a vehicle combustion engine.

While FIGS. 1-2 are directed to an extruder and ceramic honeycomb body manufactured by firing parts extruded by the extruder, the vibratory cutting apparatus 100 can be utilized for cutting different types of workpieces (other than honeycomb bodies) in any number of other applications or industries. For example, as described herein, the vibratory cutting apparatus 100 is particularly well suited to applications that would benefit from thin and/or precise cuts, and/or that have large workpieces (e.g., requiring a blade with an axial length of greater than 4-6 inches), or workpieces that comprise materials that are highly susceptible to plastic deformation, which traditionally are not well suited to being cut by prior vibratory cutting systems.

Referring now to FIGS. 1 and 3-5, aspects, features, and components of the vibratory cutting apparatus 100 will be discussed in more detail. The apparatus 100 comprises a transducer 102 configured to produce vibratory oscillations. For example, the transducer 102 can comprise one or more piezoelectric components, rotatable cams, electromagnets, or other mechanisms capable of producing vibrations, such as by converting electrical energy into kinetic energy. The transducer 102 can be configured to produce vibrations at one or more target frequencies, e.g., controlled by the output of a generator 103 that is in data communication with the transducer 102. The generator 103 can comprise suitable software and hardware components for achieving, monitoring, and/or maintaining a target frequency. For example, the frequencies can range from a few hundred hertz to dozens or even hundreds of kilohertz. In some embodiments, the frequency of the vibrations generated by the transducer is at least 1 Hz, at least 10 Hz, at least 100 Hz, at least 500 Hz, at least 1 KHz, at least 5KHz, at least 10 KHz, at least 50 KHz, or even 100 KHz, or a range formed by any of pair of these values as end points, such as from 1 Hz to 100 KHz, from 1 Hz to 50 KHz, from 1 Hz to 10 KHz, from 100 Hz to 100 KHz, from 100 Hz to 50 KHz, or from 100 Hz to 10 KHz. In some embodiments, the vibratory cutting apparatus 100 is an ultrasonic cutting apparatus with the transducer 102 configured to produce vibrations having an ultrasonic frequency.

As described in more detail below, the vibrations create back and forth movement of a cutting implement 104 in an axial direction 105 (shown in FIG. 3), which corresponds to a cutting direction, of the cutting implement 104. That is, the cutting implement 104 has a "macro" or "major" movement in the axial direction 105 (e.g., a movement on the order of inches or larger to cut through the workpiece), while the vibrational energy produces a "micro" or "minor" movement in the axial direction 105 (e.g., oscillating movements on the order of fractions of an inch or smaller). In some embodiments, the cutting element 104 is coupled to an actuator 107, such as a linear actuator, e.g., comprising one or more rollers, screws, pulleys, racks and pinions, pistons, or the like, for repeatedly moving the cutting element 104 (aforementioned "macro" or "major" movement) through a cutting stroke. While the arrow designating the axial direction 105 is shown throughout several of the drawings as directed up-down with respect to the orientation of the corresponding drawing, the axial direction 105 (and corresponding cutting stroke and vibratory oscillations) can have any suitable orientation, such as a horizontal or vertical orientation.

The cutting element 104 of the apparatus 100 is coupled to the output of the transducer 102, and thereby receives the vibratory output of the transducer 102. The cutting element 104 comprises a horn (or horn portion) 106 and a blade (or blade portion) 108. For example, the horn 106 can comprise the cutting blade 108 and/or the cutting blade can be otherwise integrally formed with the horn 106. The structure (e.g., thickness, axial length, and other dimensions) of the horn 106 can be configured to augment the vibratory energy received from the transducer 102, e.g., by amplifying the oscillating displacement ("micro" movement) resulting from the produced vibrations. For example, the horn 106 can be created such that it comprises one or more thicknesses (e.g., thicknesses T1, T2 in FIG. 3) that is/are thicker than that of a thickness (e.g., a thickness t shown in FIGS. 2 and 3) of the blade 108, which facilitates the ability of the horn 106 to amplify the vibrations. Any suitable geometry and/or design can be utilized for the horn 106.

Figure 4:
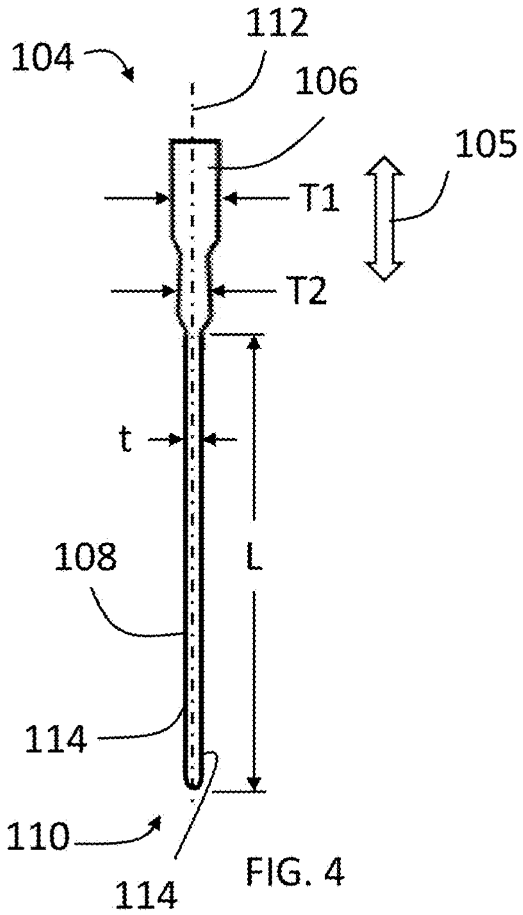
FIG. 4 is a side view of a cutting element for a vibratory cutting apparatus according to some embodiments disclosed herein.

The blade 108 extends in the axial direction 105 from the horn 106, terminating in a cutting edge 110 and having an axial length L (shown in FIGS. 3-4). The cutting edge 110 can be sharpened, e.g., being tapered or beveled on one or both sides, flat, rounded, or have any other suitable configuration. The cutting edge 110 extends along a width W of the blade 108. The length L of the blade 108 can be set approximately equal to the length of the desired cutting stroke ("macro" movement) for the cutting element 104, thereby enabling the blade 108 to fully cut through workpieces 33 having a dimension in the axial direction 105 of approximately equal to, or less than, the length L. For example, the actuator 107 can be configured to move the cutting element 104 in the axial direction 105 a distance approximately equal to the length L, then return the cutting element 104 its initial position. The cutting stroke can be repeated for each section of the workpiece 33 that is desired to be cut.

Together, the dimensions of the width W and axial length L define a cutting plane for the blade 108, e.g., indicated in cross-section as plane 112 in FIG. 3. Opposing surfaces (e.g., first and second surfaces, and/or front and back surfaces) 114 of the blade 108 extend axially from the cutting edge 110 to connection with the horn 106 and are parallel to the cutting plane 112 defined by the width W and the length L. The thickness t is defined extending transversely (perpendicular to the cutting plane 112) between the opposing surfaces 114.

In some embodiments, the length L of the blade 108 is greater than 6 inches (15.24 cm), while the thickness t is less than 0.125 inches (3.175 mm). For example, in some embodiments, the length L is at least 7 inches (17.78 cm), at least 8 inches (20.32 cm), at least 9 inches (22.86 cm), at least 10 inches (25.4 cm), at least 11 inches (27.94 cm), at least 12 inches (30.48 cm), at least 13 inches (33.02 cm), at least 14 inches (35.56 cm), or at least 15 inches (38.1 cm), while the thickness t of the blade 108 is at most 0.11 inches, at most 0.1 inches (2.794 mm), at most 0.09 inches (2.286 mm), at most 0.08 inches (2.032 mm), at most 0.07 inches (1.778 mm), at most 0.06 inches (1.524 mm), at most 0.05 inches (1.27 mm), at most 0.04 inches (1.016 mm), at most 0.03 inches (0.762 mm), at most 0.02 inches (0.508 mm), at most 0.015 inches (0.381 mm), at most 0.012 inches (0.305 mm), at most 0.01 inches (0.254 mm), or even at most 0.006 inches (0.152 mm), including all ranges for the length L and thickness t that include these values as end points. For example, in some embodiments, the length L of the blade 108 is from 11 inches (27.94 cm) to 15 inches (38.1 cm), while the thickness t is from 0.006 inches (0.152 mm) to 0.1 inches (2.794 mm).

As described herein, the apparatus 100 is configured to cause oscillation ("micro" movement) of the cutting blade 108 with respect to the axial direction 105. For example, if such oscillations were only in axial direction 105, then the blade 108 would be maintained along the cutting plane 112, which results in a precise cut as the blade 108 travels in the axial direction through the workpiece 33. To this end, the transducer 102 can be configured to provide vibrations at a frequency corresponding to (e.g., capable of exciting or causing resonation of) one or more vibrational resonance modes of the cutting element 104 that are orientated axially with the direction 105. However, the cutting element 104 will have vibrational modes oriented with respect to not only the axial direction 105 but directions transverse to this direction, and these other modes may also be energized at frequencies tuned to axially-oriented modes. Of particular note, vibrational modes oriented transverse to the cutting plane 112 ("out of plane" modes) may cause the blade 108 to flex, bend, or wobble out of alignment with the cutting plane 112 during energization by the transducer, thereby reducing precision of the cut (e.g., increasing kerf and decreasing cut quality). Furthermore, as described herein, as the length L is increased and/or the thickness t decreased, the number of out of plane modes that exist, and/or which come before the axially oriented mode, are increased, which may exacerbate the out of plane vibrations exhibited by the cutting blade.

To reduce the out of plane vibrations, the vibratory cutting apparatus 100 comprises a set of fluid bearings 120 positioned to apply a fluid pressure on the blade 108. The fluid bearings 120 can be non-contact fluid static bearings, i.e., applying a pressurized fluid against the blade 108 to maintain a fluid (e.g., air) gap between the fluid bearings 120 and the blade 108. For example, the fluid bearings 120 can apply pressure on the blade 108 in a direction transverse to the cutting plane 112 in order to prevent out of plane vibrations. In some embodiments, the fluid bearings 120 are arranged to apply pressure on both opposing surfaces 114 in opposing directions perpendicular to the surfaces 114 and thus also perpendicular to the cutting plane 112. In this way, the blade 108 can be axially stiffened via the application of pressure against the surfaces 114 of the blade 108. By axially stiffening the blade 108, the number of out of plane resonant modes can be reduced and/or the axially oriented mode can be moved to a higher order.

The fluid static bearings can be in communication with a pressurized fluid source 122 via a conduit 124 in order to apply a pressure against the surfaces 114 of the blade 108. The fluid source 122 can comprise a pressurized tank or vessel, a pump, a compressor, or combinations thereof. The conduit 124 can comprise a fluid line or tube, as well as any couplings useful for delivering the pressurized fluid to the blade 108. In some embodiments, the fluid bearings 120 are hydrostatic or aerostatic bearings, although any suitable liquid (e.g., oil) or gas (e.g., air, nitrogen, or other generally inert gases) can be used. In some embodiments, a gas such as air is utilized for the fluid bearings 120 in order to avoid the need to handle (e.g., seal off and/or recirculate) a liquid, such as oil, as well as to minimize the potential effect the fluid media may have on the workpiece being cut (e.g., some liquids may weaken or otherwise impact the properties of a green ceramic body, such as the green strength or ability to dry or fire, if such liquids come into contact with the workpiece during cutting). In some embodiments, the fluid bearings 120 comprise porous media bearings, although orifice bearings or other fluid static bearings can be used. In comparison to other types of bearings, such as mechanical bearings and/or fluid dynamic bearings that dissipate energy by dampening vibrations, fluid static bearings may advantageously reduce out of plane vibrations by providing stiffening of the blade, which conserves the vibrational energy by redirecting the energy axially, which may result in increased efficiency of energy transmission through the blade.

Figure 5:
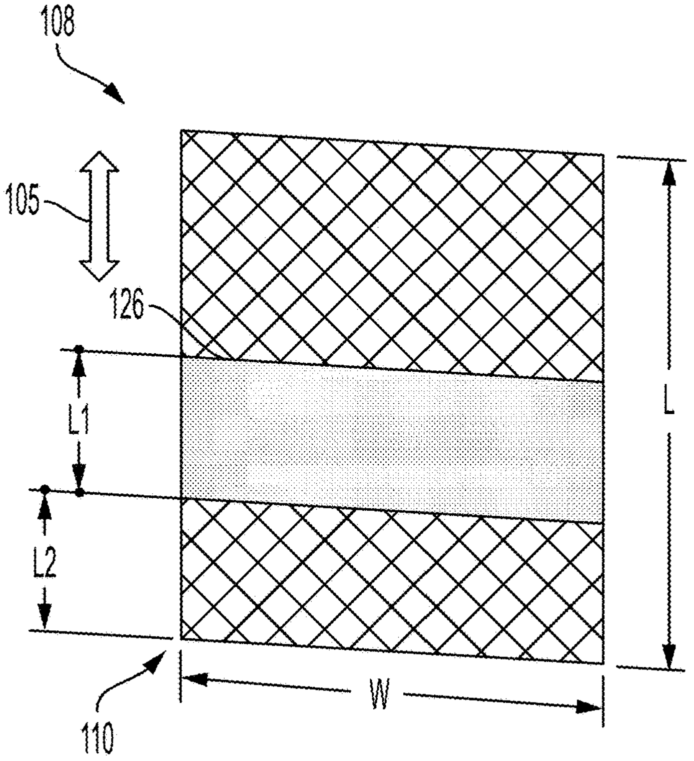
FIG. 5 shows a blade for a vibratory cutting apparatus according to some embodiments disclosed herein.

As shown in FIG. 5, the pressure from the fluid bearings 120 can be applied to stiffen the blade 108 in one or more specified areas, such as an area 126. As illustrated in FIG. 5, the area 126 spans the entirety of the width W of the blade 108, although pressure can be applied in other embodiments over at least a portion of the width W. In FIG. 5, the area 126 extends over a portion L1 of the length L, thereby leaving unstiffened lengths on either side of the area 126, e.g., a length L2 of an unstiffened end portion of the blade 108 is illustrated in FIG. 5 between the stiffened area 126 and the cutting edge 110.

In some embodiments, the fluid bearings 120 are stationary, such that the fluid bearings 120 provide dynamic stiffening along at least a portion of the length L of the blade 108 as the blade 108 is moved toward and/or through the workpiece 33 in the axial direction 105. With respect to FIG. 5, the unstiffened portion L2 changes depending on the location of the blade 108 with respect to the axial direction 105 during cutting of a workpiece. For example, as the blade 108 is axially moved in the axial direction 105 to cut through a workpiece, the length L2 of the unstiffened portion would increase. However, as illustrated in the sequence (A) to (C) of FIG. 6, in which out of phase vibrations are indicated by shading, as the blade 108 is axially moved during cutting, the unstiffened portion will increasingly bite into the workpiece, thereby also being at least partially supported by the workpiece itself.

Figure 6:
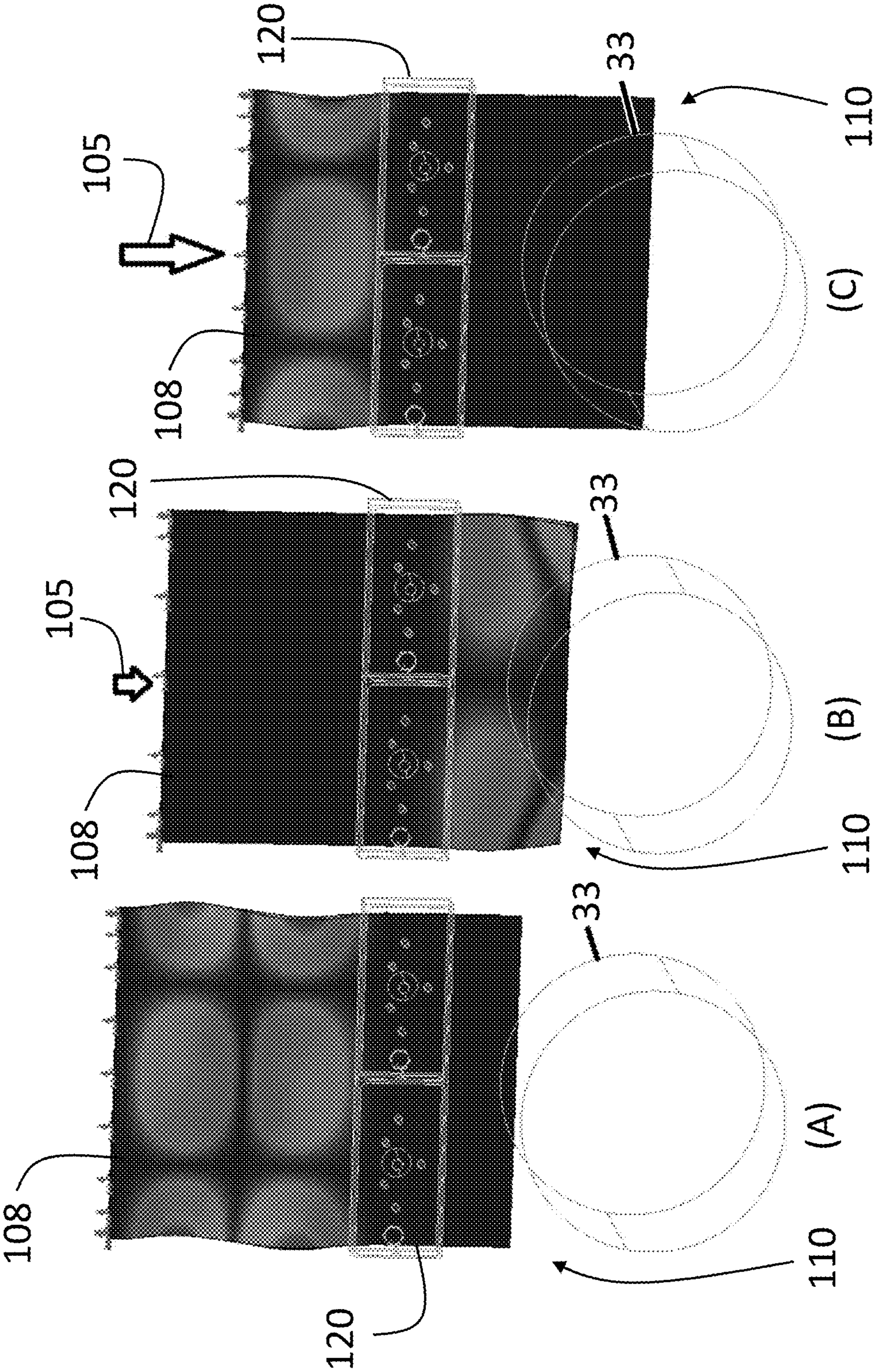
FIG. 6 shows three frames of a cutting process using a fluid bearing stiffened blade according to some embodiments disclosed herein.

More particularly, in frame (A) of FIG. 6, which shows the beginning of a cutting stroke ("macro" movement) of the blade 108, the unstiffened end portion of the blade 108 proximate to the cutting edge 110 is relatively short, and thus the fluid bearings 120 provide sufficient stiffening to constrain out of plane vibrations at the cutting edge 110. As the blade 108 is axially moved in the direction 105 as shown in frame (B) of FIG. 6, the unstiffened end portion increases in size and some out of plane vibration is seen by the cutting edge 110. However, once the blade 108 is sufficiently engaged in the workpiece 33, as shown in frame (C) of FIG. 6, the out of plane vibrations are both constrained by the fluid bearings 120 and also dampened by the workpiece 33, such that there is only a small amount of out of plane vibration in the axial end of the blade 108 opposite to the cutting edge 110.

Figure 7A:
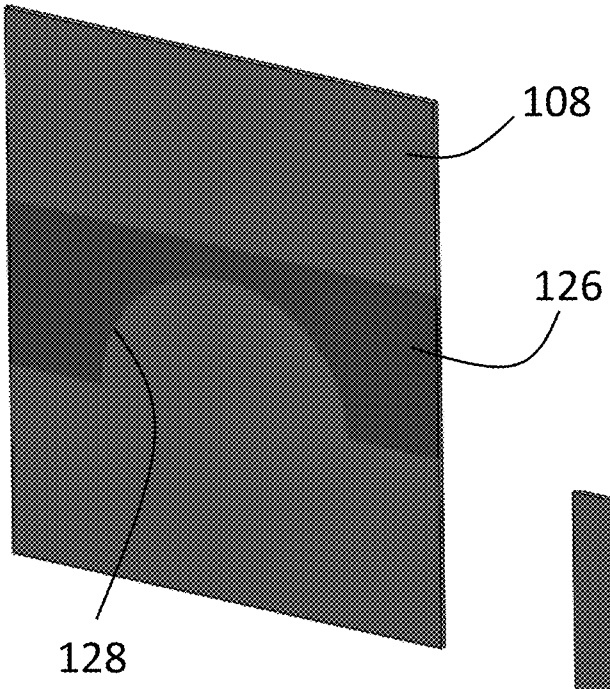
FIGS. 7A and 7B illustrate shapes of areas in which pressure is exerted on vibratory cutting blades according to some embodiments disclosed herein.
Figure 7B:
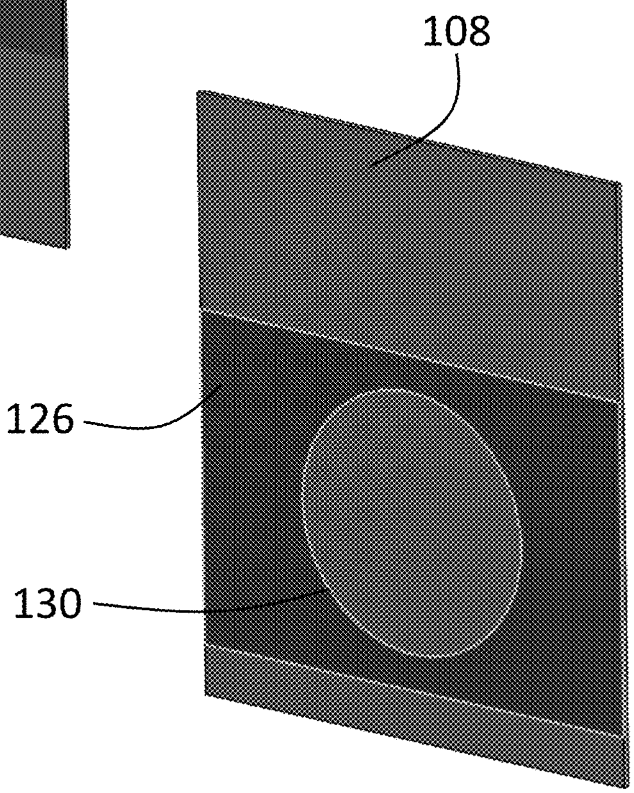

The shape of the pressure area 126 of the fluid bearings 120 does not need to be rectangular, and does not need to be arranged entirely at only one axial side of the workpiece 33 during cutting. For example, FIGS. 7A-7B illustrate alternate embodiments for the shape of the pressure area 126 (and thus, corresponding shape of the fluid bearings 120). In particular, the embodiments of FIGS. 7A-7B show fluid bearing shapes that can be used for cutting ellipsoidal, cylindrical, or workpieces having other rounded outer peripheral shapes. For example, in FIG. 7A, the area 126 comprises a shape that comprises a semi-circular cutout 128, which would accommodate positioning of a portion of the outer peripheral shape workpieces having cylindrical or ellipsoidal shapes. In FIG. 7B, the area 126 has a circular cutout 130, which can circumscribe the entirety of the outer periphery (e.g., circumference) of cylindrical workpieces. In this way, the shape of the area 126 (and thus, the shape of the fluid bearings 120 that exert pressure in the shape of the area 126) can be configured to provide additional stiffening around the periphery of the workpiece 33 as the workpiece is cut. For example, as discussed with respect to FIG. 9A, the fluid bearings 120 can comprise cutouts through which the workpiece is passed and positioned during cutting.

Figure 8A:
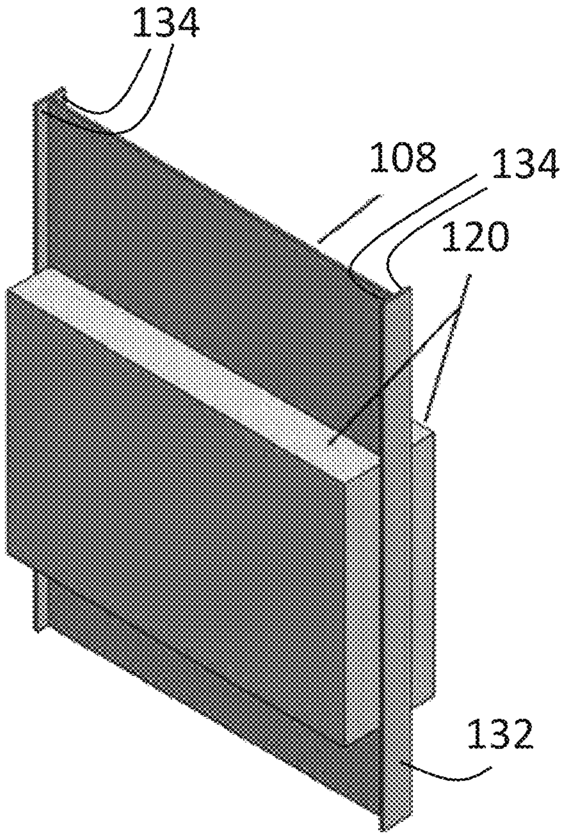
FIGS. 8A and 8B are respective perspective and partial top views of a cutting blade and fluid bearings according to some embodiments disclosed herein.
Figure 8B:
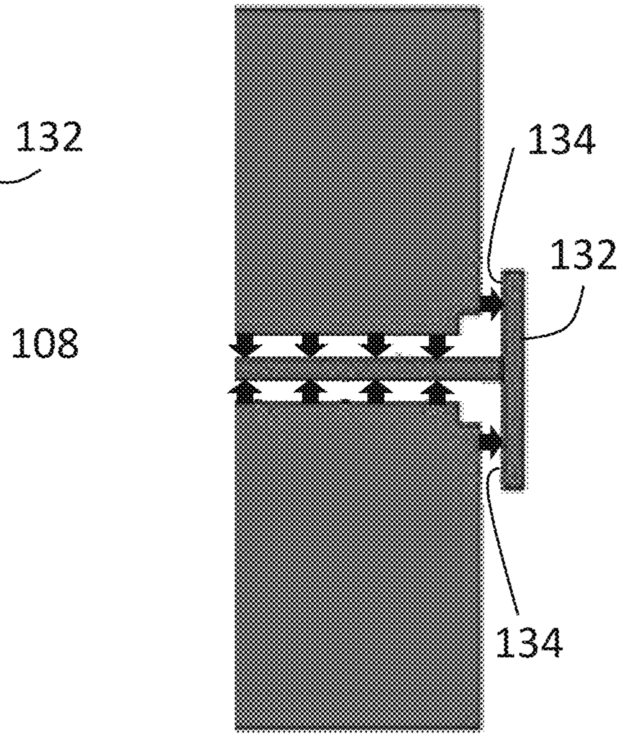

FIGS. 8A-8B illustrate one embodiment for the blade 108 and fluid bearings 120. In FIGS. 8A-8B, the blade 108 comprises flanges 132 running axially along the length of the blade 108. The fluid bearings 120 are configured to exert pressure not only perpendicular to the surfaces 114, but also perpendicular to surfaces 134 of opposing flanges. In this way, the fluid bearings 120 axially stiffen the blade 108 in accordance to the above description of the fluid bearings 120, while also putting the blade 108 into tension in the widthwise direction, which can assist in further reducing out of plane vibrations in some embodiments.

Figure 9A:
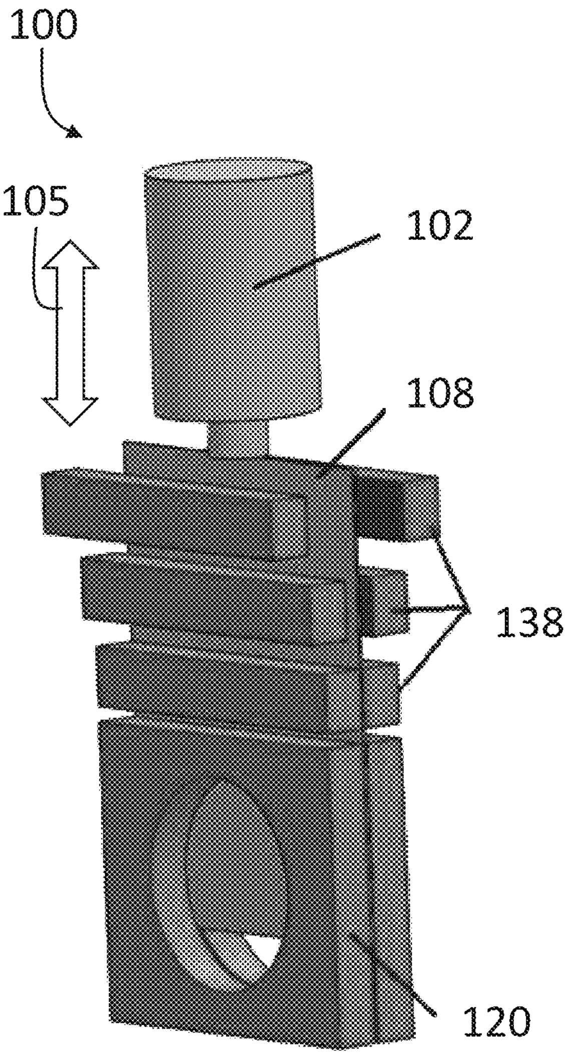
FIGS. 9A and 9B are respective perspective and side views of a vibratory cutting apparatus comprising fluid bearings and auxiliary bearings according to some embodiments disclosed herein.
Figure 9B:
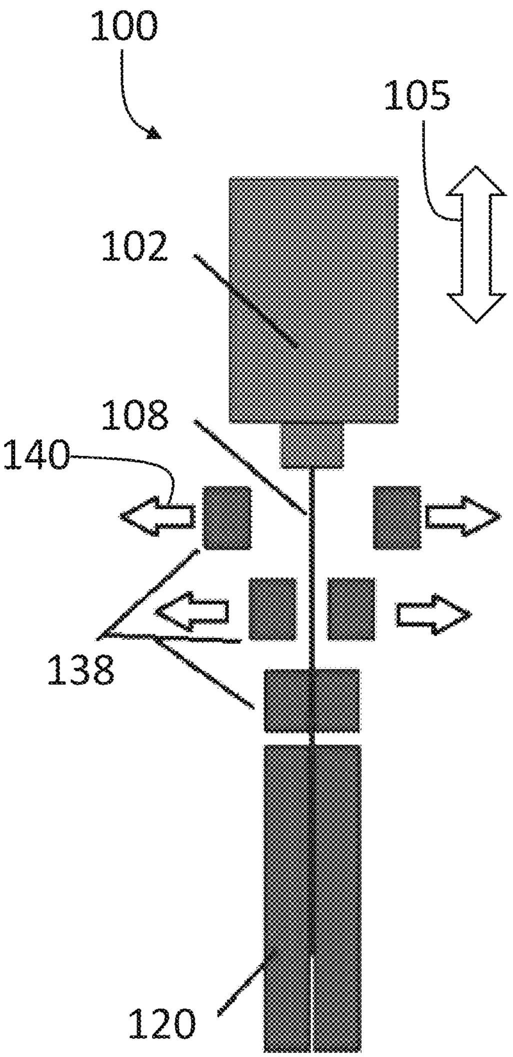

FIGS. 9A-9B illustrates one embodiment for the vibratory cutting apparatus 100. The fluid bearings 120 have a cutout 136 (e.g., hole) configured to provide access for the workpiece 33 to be passed through during cutting. In this way, the pressure area (e.g., the area 126) created by the fluid bearings 120 resembles that of the pressure area 126 in FIG. 7B, with the cutout 136 corresponding to the cutout 130. However, the fluid bearings 120 can take any of the other forms described herein.

The apparatus 100 also comprises one or more pairs of auxiliary bearings 138, with three such pairs of auxiliary bearings 138 shown in FIGS. 9A-9B. The pairs of auxiliary bearings 138 are configured to temporarily support a portion of the blade 108 and then to move away from the blade 108 as the cutting element 104 is moved axially in the direction 105. For example, as noted above, the cutting element 104 can comprise components that are thicker than the blade 108 at the end of the blade 108 opposite to the cutting edge 110, such as the transducer 102 (as shown in FIGS. 9A-9B), the horn 106, etc. In this way, the pairs of auxiliary bearings 138 can move away from the cutting blade 108 in order to enable passage of such thicker components, which enables axial stiffening of the blade 108 along a greater portion of its length L while avoiding physical interference between the bearings 138 and the thicker components of the cutting element. For example, the pairs of auxiliary bearings 138 can be moved by one or more actuators, e.g., linear actuators or components thereof, such as rollers, screws, pulleys, racks and pinions, pistons, or the like. In FIGS. 9A-9B, the auxiliary bearings 138 are moved in a direction 140 perpendicular to the cutting plane, but in other embodiments the auxiliary bearings can be moved in another direction out of alignment with the blade 108, such as in the widthwise direction. In some embodiments, the auxiliary bearings 138 are of the same type of bearing as the fluid bearings 120. However, the auxiliary bearings 138 can also comprise other types of bearings, including mechanical bearings, such as roller bearings.

Figure 9D:
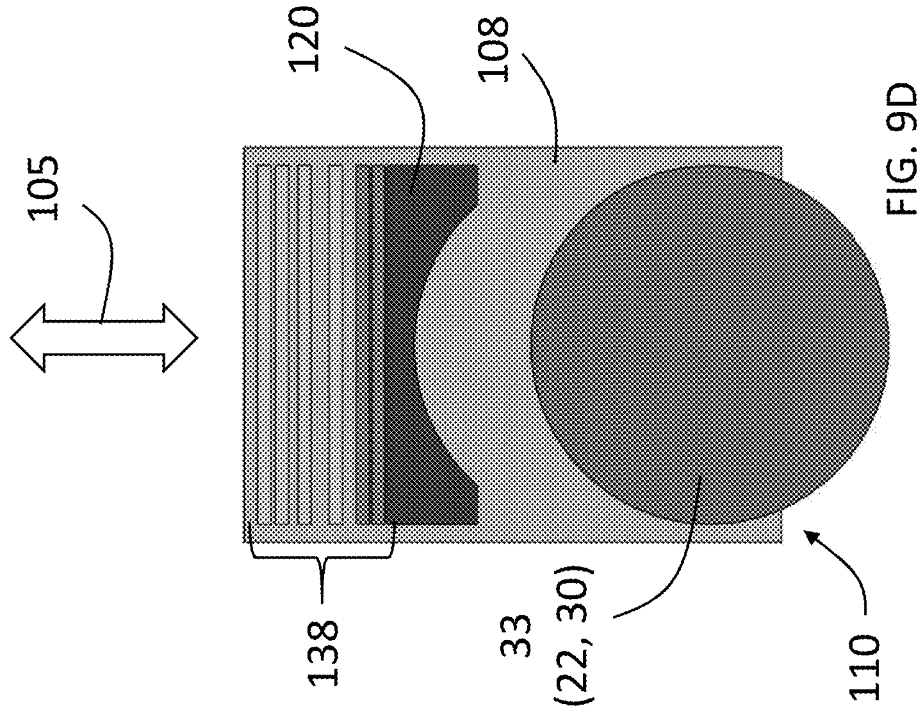
FIGS. 9C and 9D schematically illustrate a vibratory cutting apparatus comprising fluid bearings and auxiliary bearings at respective positions of a blade cutting stroke according to some embodiments disclosed herein.
Figure 9C:
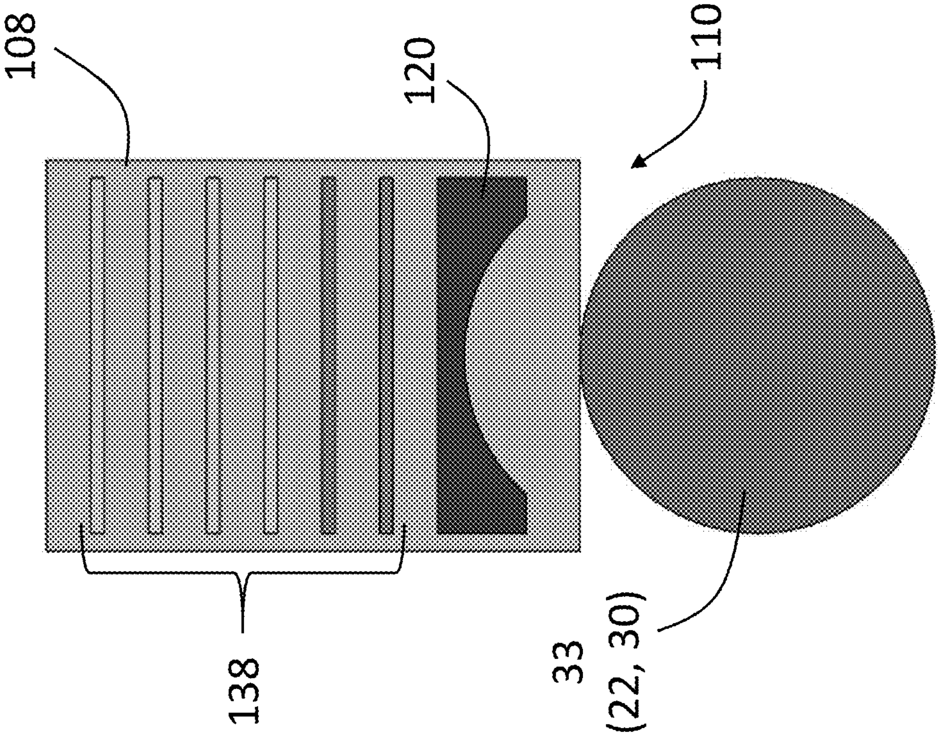

FIGS. 9C-9D show an alternate arrangement for the auxiliary bearings 138. In the embodiment of FIGS. 9C-9D, the auxiliary bearings are arranged so that they axially retract toward and extend away from the respective fluid bearing 120 during travel of the blade 108 through its cuttings stroke ("macro" movement) in the axial direction 105. For example, FIG. 9C illustrates the blade 108 at a position along its cutting stroke in which the cutting edge 110 is just encountering the workpiece 33 (e.g., extrudate 22 or green body 30), while FIG. 9D illustrates the blade 108 after the blade 108 has cut through a majority of the workpiece 33. By holding the fluid bearing 120 stationary (in the same position in both FIGS. 9C and 9D) while moving the blade 108 back and forth through its cutting stroke, the auxiliary bearings 138 are correspondingly retracted toward and extended away the fluid bearing 120. That is, the axial distance between the auxiliary bearings 138 and/or between the auxiliary bearings 138 and the fluid bearings 120 is increased (FIG. 9C) and decreased (FIG. 9D) as the blade 108 is moved back and forth in the axial direction 105. For example, as shown by a comparison of FIGS. 9C and 9D, the auxiliary bearings 138 move relative to the fluid bearing 120 in order accommodate the changing area of the end portion the surfaces 114 of the blade 108 that are opposite to the workpiece 33. The auxiliary bearings 138 can be connected or held together and/or to the fluid bearing 120 by a flexible or collapsible member, such as a wire, string, rope (e.g., akin to window blinds), and/or a fabric or other flexible or foldable membrane (e.g., akin to an accordion). The auxiliary bearings 138 can also be commonly connected on or along one or more axially-directed tracks or rails that assist in maintaining alignment and positioning of the auxiliary bearings 138 relative to the blade 108 (thus assisting in exerting a target pressure on the blade 108 with the auxiliary bearings 138) while permitting the relative movement with respect to the fluid bearing 120.

Figure 10:
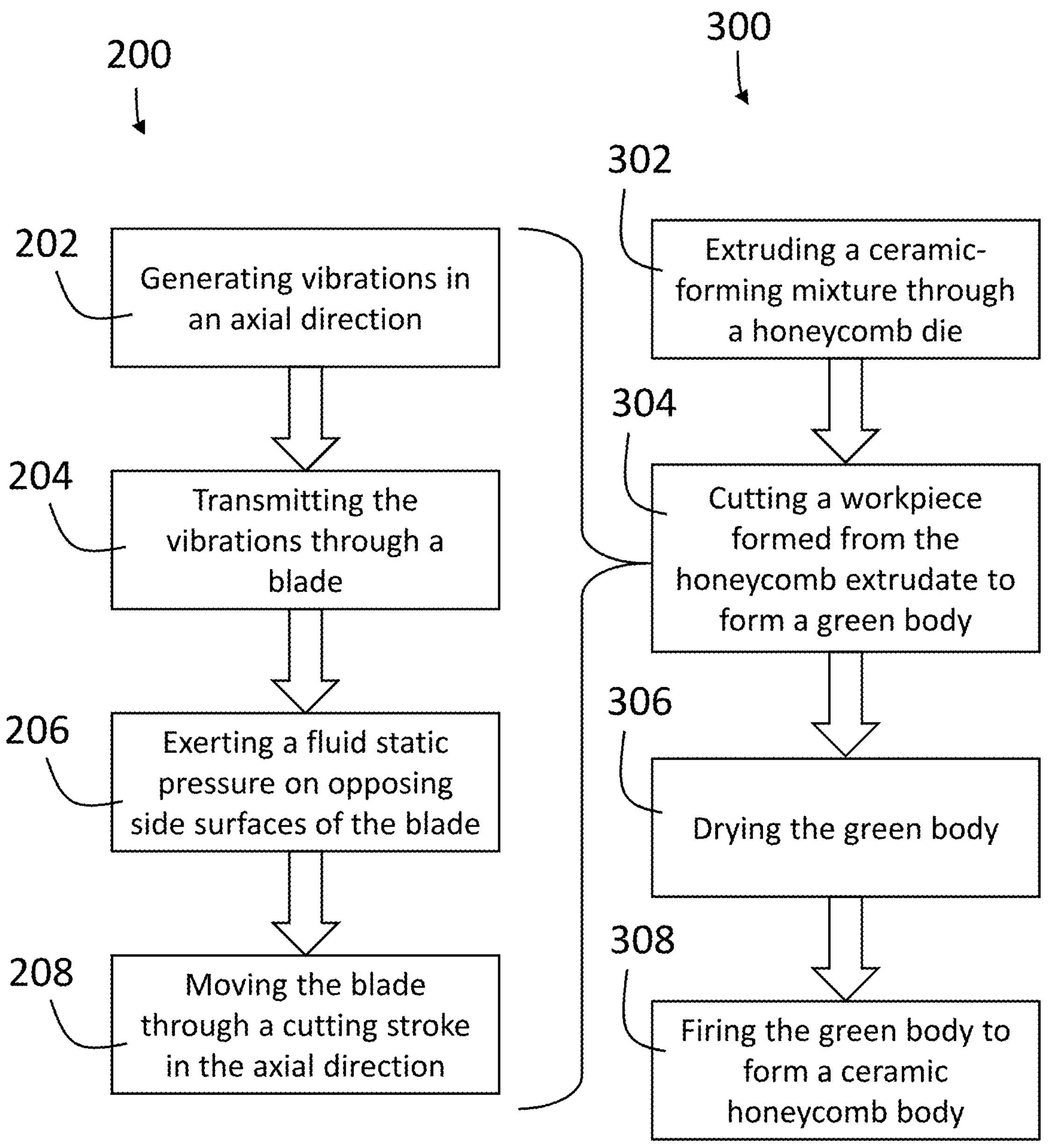
FIG. 10 illustrates a method of vibratory cutting, and a method of manufacturing a ceramic honeycomb body utilizing the method of vibratory cutting, according to some embodiments herein.

FIG. 10 shows a method 200 for vibratory cutting of a workpiece (e.g., the workpiece 33) with a vibratory cutting apparatus (e.g., the vibratory cutting apparatus 100). In step 202, vibrations are generated (e.g., by the transducer 102 via power from the generator 103) in an axial direction (e.g., the axial direction 105). In step 204, the vibrations are transmitted through a vibratory cutting blade (e.g., the blade 108). In step 206, a fluid static pressure is exerted (e.g., by the set of fluid bearings 120) on opposing side surfaces of the blade (e.g., the side surfaces 114 of the blade 108). In step 208, the blade is moved (e.g., via the actuator 107) through a cutting stroke in the axial direction to cut the workpiece. The step 206 can comprise temporarily supporting the opposing side surfaces of the blade with one or more pairs of auxiliary bearings (e.g., the auxiliary bearings 138). The step 206 can comprise exerting the fluid static pressure on opposing flanges of the blade to put the blade in tension with respect to a widthwise direction of the blade. The step 208 can comprise moving the blade relative to the fluid bearings while traversing the cutting stroke.

FIG. 10 also shows a method 300 for manufacturing a ceramic honeycomb body. In step 302, a ceramic-forming mixture (e.g., the mixture 18) is extruded through a honeycomb extrusion die (e.g., the extrusion die 20) of an extruding system (e.g., the extruding system 10) to form a honeycomb extrudate (e.g., the extrudate 22). In step 304, a workpiece formed from the honeycomb extrudate is cut to for a green body (e.g., the green body 30). For example, the workpiece in step 304 can be the honeycomb extrudate itself or a log previously cut from the honeycomb extrudate. The step 304 can comprise each of the steps of the method 200. At step 306, the green body is dried, and at step 308 the green body is fired to formed a ceramic honeycomb body (e.g., the honeycomb body 50).

EXAMPLES

To quantify the axial dynamic stiffness of a blade, e.g., thereby enabling a simpler comparison between different materials and/or dimensions, the number of vibrational modes before the first axial mode and the frequency of the first axial mode can be simulated, e.g., via finite element analysis. For example, 150 mm (W)×180 mm (L) blades were simulated using FEA having three different thicknesses: (i) 2.3 mm, (ii) 4.6 mm, and (iii) 10.1 mm. The first axial resonance mode of the 2.3 mm thick blade was number 34 at 7.114 kHz, the first axial resonance mode of the 4.6 mm blade was number 20 at 7.115 kHz, and the first axial resonance mode of the 10.1 mm blade was number 11 at 7.119 kHz.

Without wishing to be bound by theory, it is believed that the first axial resonant mode frequency stays approximately the same during a change in thickness, however the number of modes before the first axial resonant mode frequency changes drastically with thickness. As a result, the axial dynamic stiffness of the blade increases with thickness of the blade. Having a large number of modes before the first axial resonance mode reduces the efficiency of the transmission of axial movement through the blade, as the vibrational energy excites out of plane vibration modes. As a result, the out of plane vibrations result in the inefficient use of input energy, thereby consuming more energy and/or requiring more energy during cutting, all while also resulting in a poorer quality cut (e.g., a thicker kerf) due to the out of plane vibrations.

In another example, a finite element analysis (FEA) simulation was run on a plate of alloy steel (simulating the blade 108) having a width (W) of 160 mm, a length (L) of 180 mm, and a thickness (t) of 2 mm that was stiffened using a simulated pair of aerostatic fluid bearings exerting a pressure of 80 PSI. The stiffened area corresponded to that shown in FIG. 5, with the fluid bearings placed on both opposing sides of the plate (corresponding to the surfaces 114). When unstiffened (no fluid bearings), the first axial resonance mode was the 40th vibrational mode and had a resonance frequency of 7,291 Hz. As a result of the stiffening, the axial resonant mode changed to the $32^{nd}$ mode while the resonance frequency remained at approximately 7,291 Hz. In other words, the number of out of plane modes that came before the axial mode was decreased from 39 when unstiffened to 31 when stiffened. As the pressure was increased to simulate a perfectly stiff bearing, the first axial resonance mode improved to number 24 having a frequency of 7,655 Hz.

This decreased number of out of plane modes before the axial resonance mode indicates an increase in the axial dynamic stiffness of the simulated blade. That is, the lower number for the axial mode indicates that there are fewer out of plane modes that may dissipate the axial vibration energy of the system. Thus, the addition of fluid bearings results in more efficient use of the axial vibration energy input (since less energy is dissipated in out of plane modes).

Figure 11:
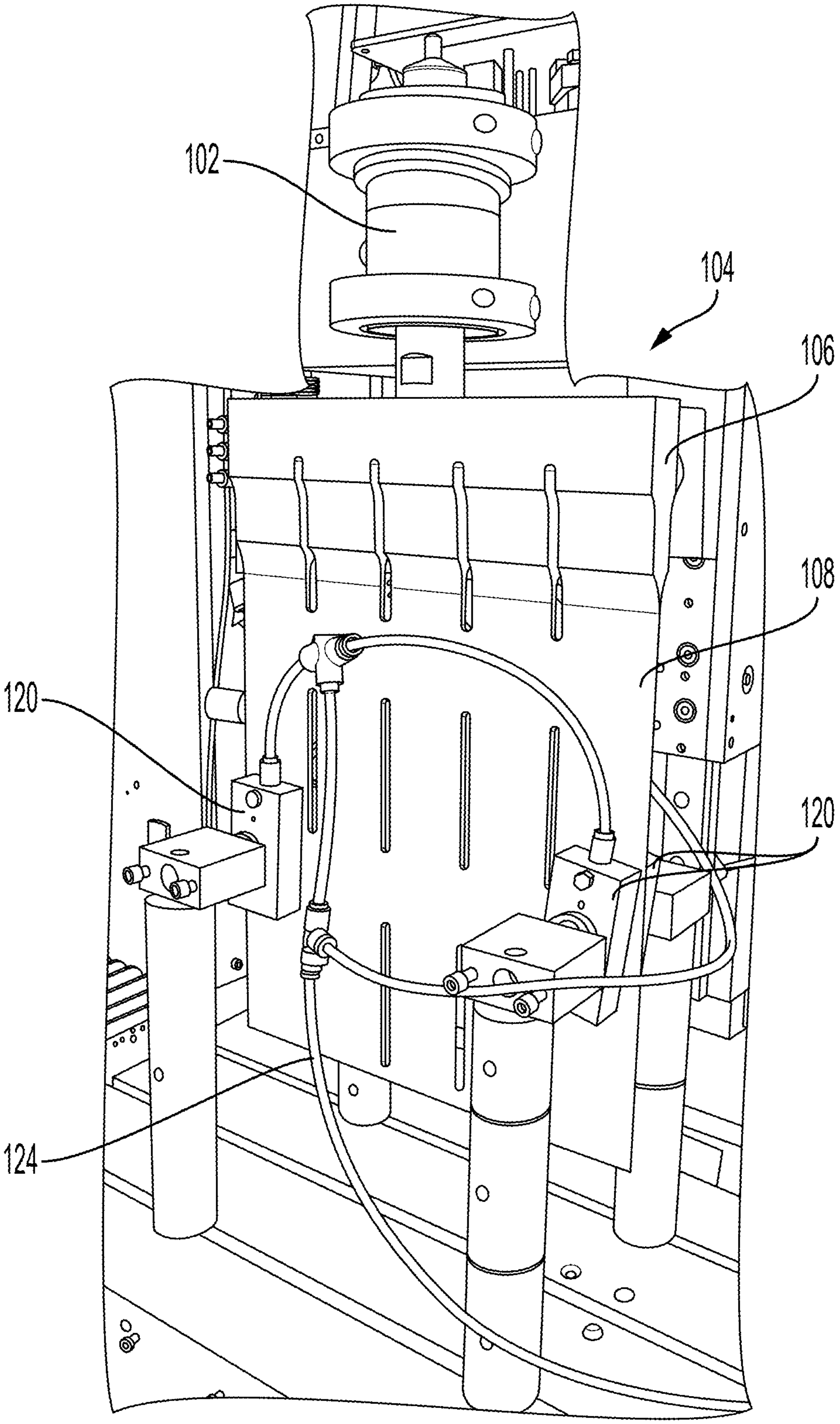
FIG. 11 shows a test setup utilized to test the effectiveness of fluid bearing stiffening according to examples described herein.
Figure 12A:
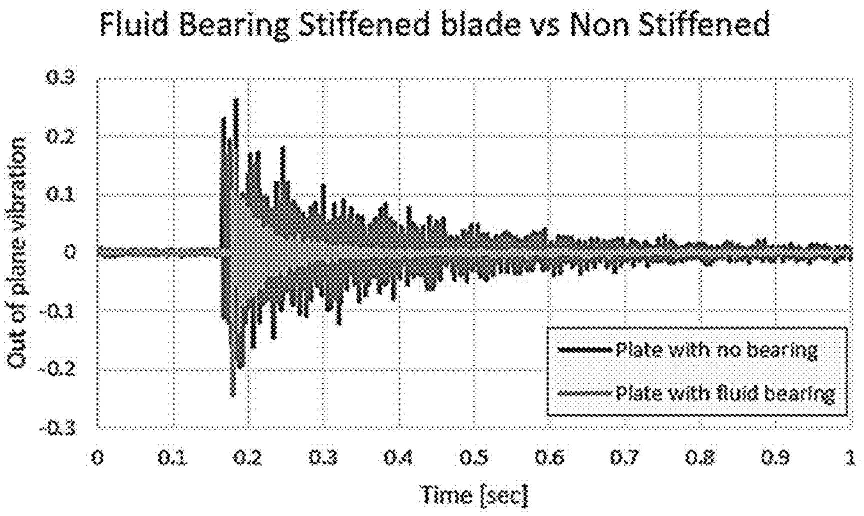
FIGS. 12A and 12B show plots for the out of plane vibrations of a blade in the test setup of FIG. 11, respectively with respect to time and frequency.
Figure 12B:
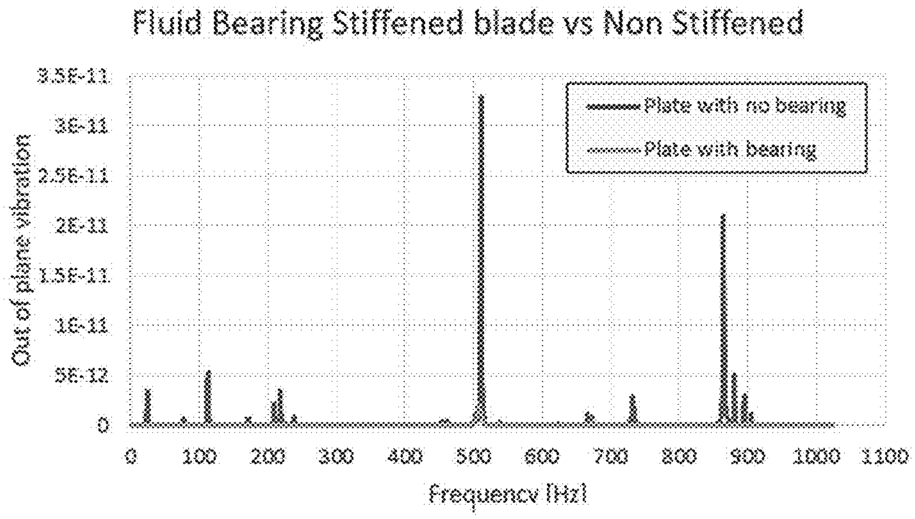
Figure 13A:
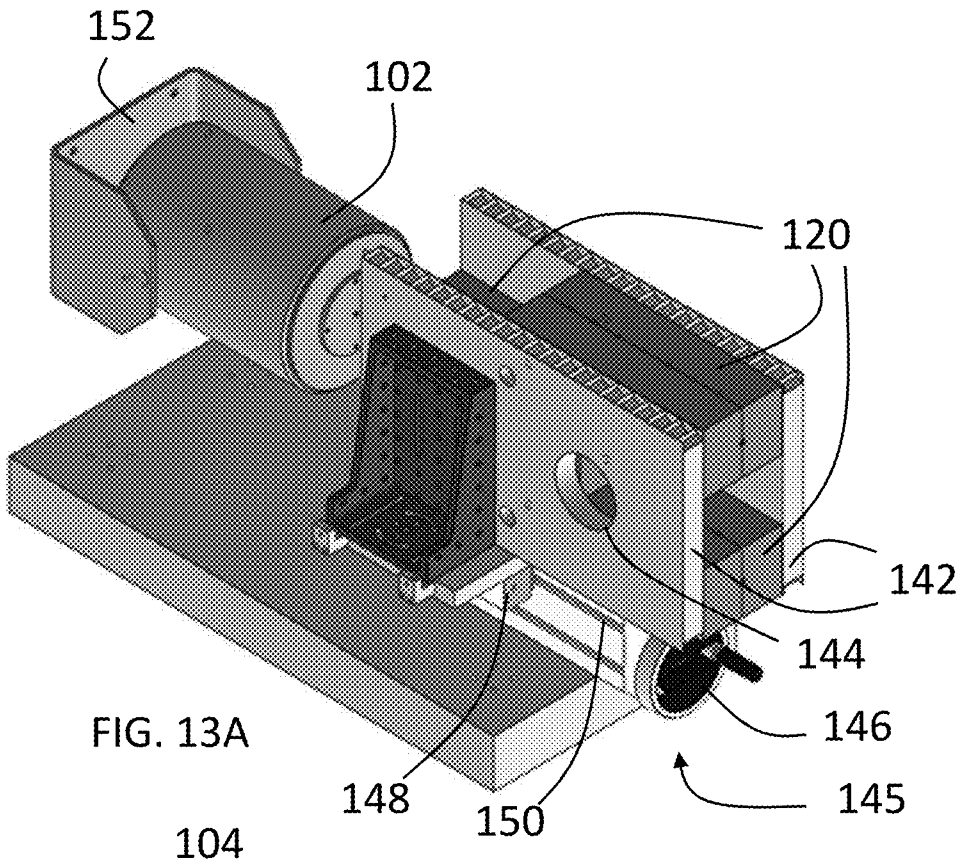
FIGS. 13A and 13B are respective perspective and side views of a test setup for evaluating a cutting operation of a vibratory blade stiffened by fluid bearings according to examples described herein.
Figure 13B:
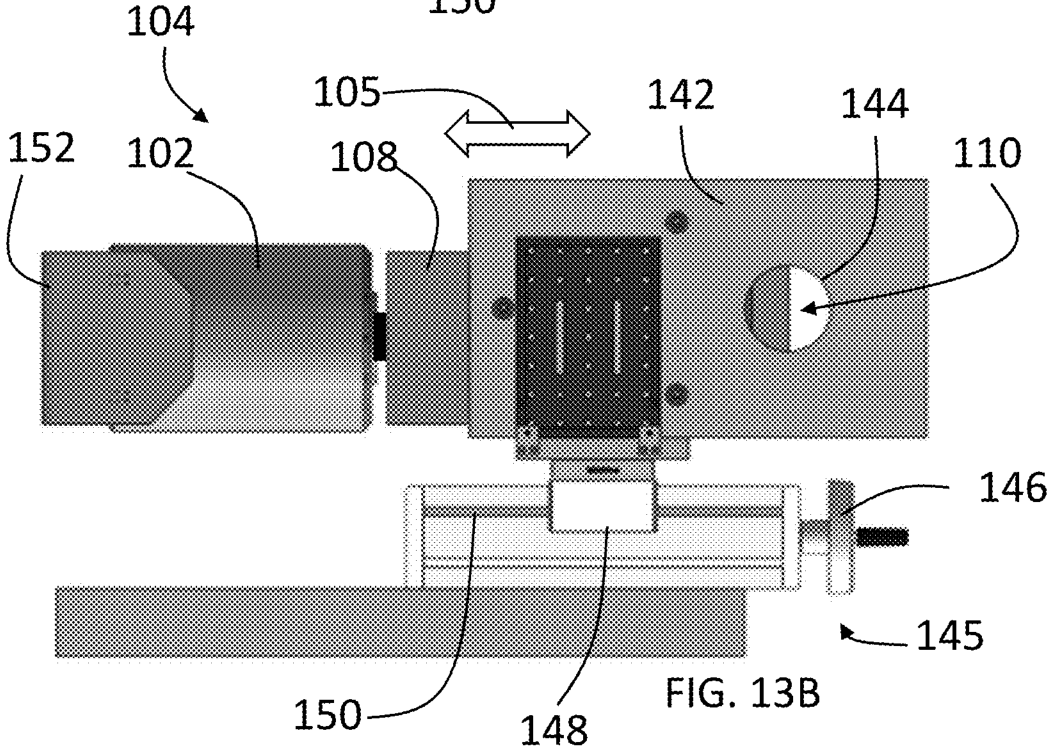
Figure 14A:
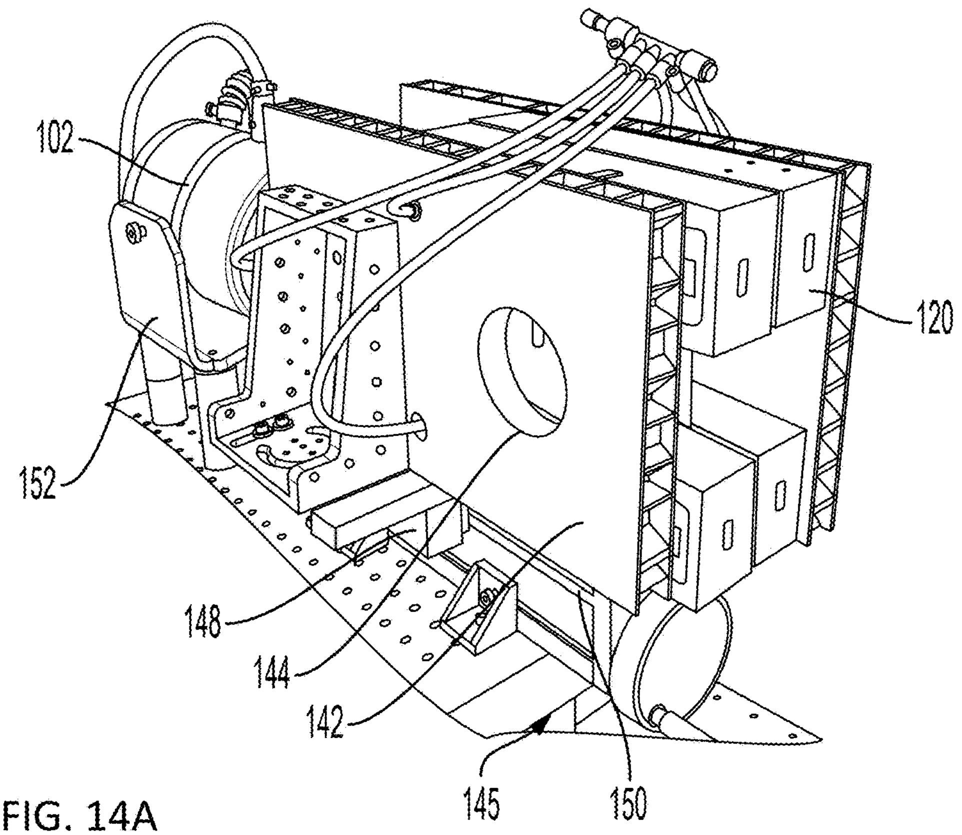
FIGS. 14A and 14B are photographs of respective perspective and side views of a test setup for evaluating a cutting operation of a vibratory blade stiffened by fluid bearings according to examples described herein.
Figure 14B:
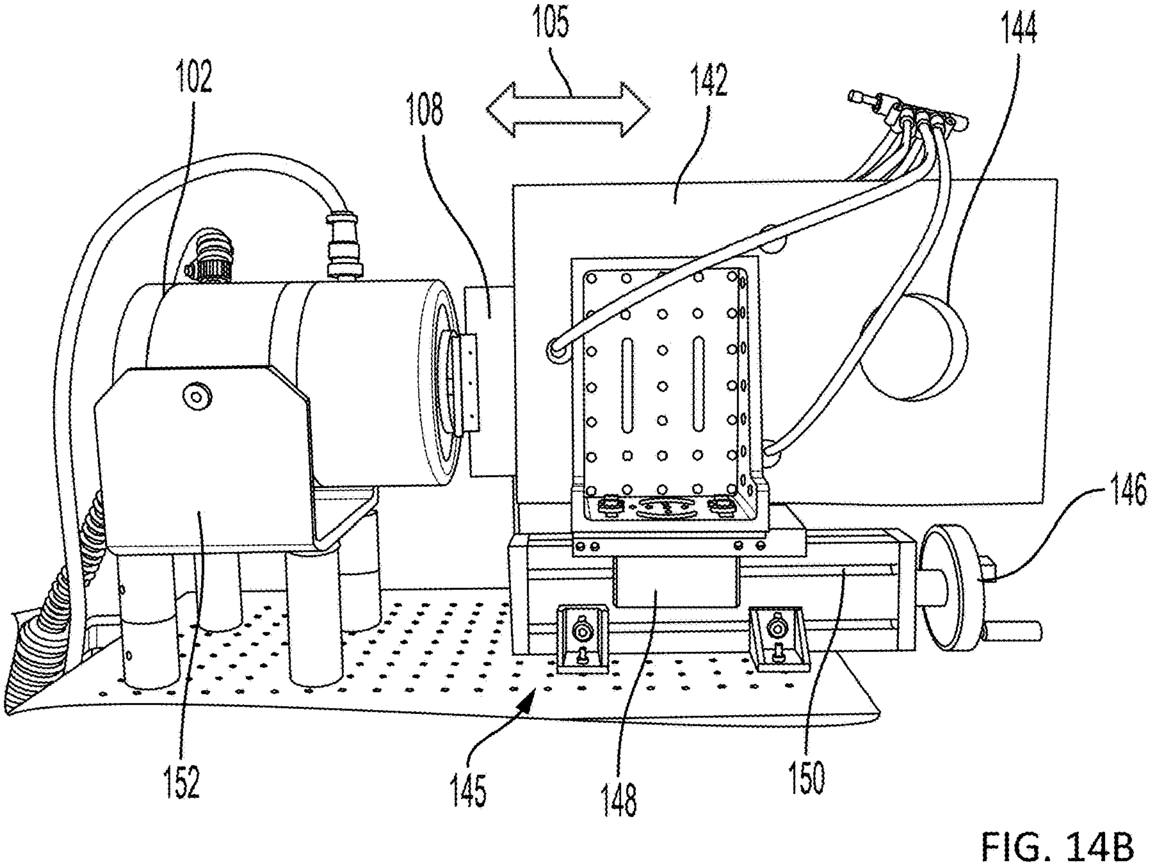

FIG. 11 shows a test setup of a vibratory cutting apparatus in accordance with another example, where four porous media air bearings were installed to provide stiffening to the blade to improve the cutting quality as described herein. FIGS. 12A-12B shows the results of a test performed using the test setup shown in FIG. 11. More particularly, FIG. 12A compares the time domain signal of the out of plane vibration of the blade when the out of plane vibration is excited by impacting the blade. The impact on all tests were performed using the same mass and height to ensure the same input of energy to the blade. It can be seen that the out of plane vibration is dampened significantly faster when the fluid bearings are present. FIG. 12B shows the frequency spectrum for both fluid bearing-stiffened and unstiffened tests, in which it can be seen that the fluid bearing stiffened blade has much less out of plane modes vibrating, e.g., by an order of magnitude or more for some frequencies.

FIGS. 13A-14B show a test setup of a vibratory cutting apparatus in accordance with another example. In this example, the blade 108 was coupled to the transducer 102 to provide vibratory oscillation ("micro" movement) of the blade 108 in the axial direction 105. The fluid bearings 120 were implemented as three pairs of two porous media bearings each (total of six porous media bearings). The fluid bearings 120 were affixed to support plates 142, which each included an opening 144 sized to receive and hold a test length of a green honeycomb body to be cut. Thus, when the honeycomb workpiece was positioned through the openings 144, one pair of the fluid bearings 120 was positioned on each side of the workpiece relative to the width of the blade 108, and one pair of the fluid bearings 120 was positioned axially between the transducer 102 and the workpiece.

Since the cutting stroke of the blade 108 is achieved by relative movement between the workpiece and the cutting edge 110, it is not required whether the workpiece is held stationary and the blade 108 moved, or whether the blade 108 is held stationary and the workpiece is moved. To this end, in the example of FIGS. 13A-14B, the workpiece (held in the openings 144 of the support plates 142), was moved in the axial direction 105 toward the blade 108 by an actuator 145 while the blade 108 was vibrated ("micro" movement) but the cutting element 104 was otherwise held stationary (no "macro" movement).

In the illustrated embodiment, actuator 145 utilized for the test was a manual crank-operated actuator in which rotation of a crank 146 caused translation of a slide platform 148 along tracks 150. The support plates 142 were mounted to the slide platform 148 by brackets, while the cutting element 104 was held stationary, i.e., by a mounting bracket 152 secured to the transducer 102.

Figure 15:
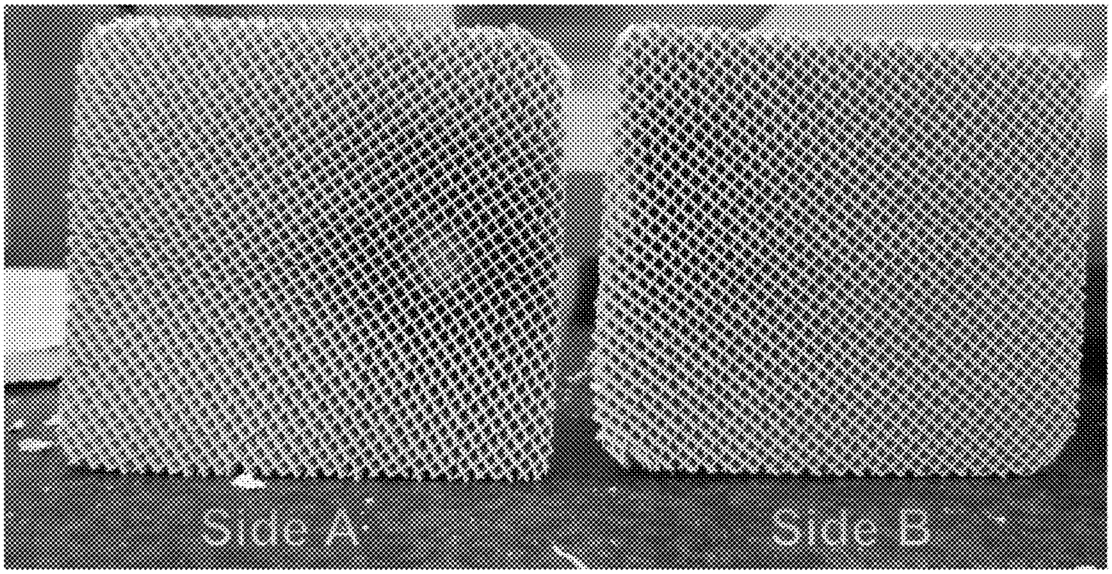
FIG. 15 is a photograph of a honeycomb body workpiece cut by the vibratory blade in the test setup of FIGS. 14A-14B.

The workpiece used in the example test of FIGS. 13A-14B was a relatively smaller cross-sectional portion was cut from a larger diameter cylindrical extrusion. As shown in FIG. 15, the workpiece was cut having approximately flat sides. The workpiece was loaded into the test setup and cut by the vibratory test apparatus within about two minutes after extruding the larger cylindrical extrusion from which the test workpiece was formed. The result of the cutting by the vibratory test apparatus of FIG. 13A-14B is shown in FIG. 15. As illustrated, the fluid bearing stiffened vibratory cutting operation resulted in a precise and clean cut, in which both the cut surfaces (Sides A and B shown in FIG. 15) were free of smearing, cell/channel distortion, channel/cell collapse, or other defects or plastic deformations.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A vibratory cutting apparatus, comprising:
- a transducer configured to generate vibrations with respect to an axial direction;
- a cutting element coupled to the transducer and configured to receive vibrations from the transducer and oscillate in the axial direction in response to the vibrations, the cutting element comprising:
  - a horn portion comprising a first thickness (T1); and
  - a blade portion integrally formed with the horn portion, the blade portion extending in the axial direction from the horn portion and terminating in a cutting edge, the blade portion comprising a width (W) and a length (L) perpendicular to the width (W), the width (W) and the length (L) defining a cutting plane of the blade portion extending in the axial direction, the blade portion further comprising opposing side surfaces extending from the horn portion to the cutting edge, and a second thickness (t) extending perpendicular to the cutting plane between the opposing side surfaces, the second thickness (t) less than the first thickness (T1);
  - an actuator coupled to the cutting element and configured to move the cutting element through a cutting stroke in the axial direction; and
- a set of non-contact fluid static bearings configured to exert a fluid pressure on each of the opposing side surfaces that constrains vibrations of the blade oriented in directions transverse to the cutting plane.

2. The apparatus of claim 1, wherein the cutting edge extends along an entirety of the width (W) of the blade portion.

3. The apparatus of claim 1, wherein the horn is coupled to the transducer and configured to amplify the vibrations in the axial direction.

4. The apparatus of claim 1, wherein the cutting element is moved in the axial direction relative to the set of non-contact fluid static bearings to traverse through the cutting stroke.

5. The apparatus of claim 1, wherein a pressure area on each of the opposing side surfaces, in which the set of non-contact fluid static bearings exert the fluid pressure, extends across an entirety of the width (W) f the blade portion.

6. The apparatus of claim 1, wherein the non-contact fluid static bearings comprise a shape that comprises a cutout to accommodate at least a portion of an outer peripheral shape of a workpiece as the workpiece passes through the cutout.

7. The apparatus of claim 6, wherein the cutout is configured to accommodate an entirety of the outer peripheral shape of the workpiece.

8. The apparatus of claim 1, wherein the blade portion comprises a pair of opposing flanges extending perpendicular to the cutting plane and along the length of the blade, the set of non-contact fluid static bearings configured to exert a second fluid pressure against the opposing flanges to put the blade portion in tension in a widthwise direction.

9. The apparatus of claim 1, further comprising one or more pairs of auxiliary bearings configured to exert a pressure against the opposing side surfaces of the blade.

10. The apparatus of claim 9, wherein the auxiliary bearings are configured to temporarily exert the pressure against the opposing side surfaces and then move away from the cutting element during the cutting stroke.

11. The apparatus of claim 9, wherein the auxiliary bearings are configured to axially retract toward and extend away from the non-contact fluid static bearings while exerting the pressure on the opposing side surfaces during travel of the cutting element in the axial direction.

12. The apparatus of claim 9, wherein the auxiliary bearings comprise fluid bearings, mechanical bearings, or both.

13. The apparatus of claim 1, wherein the length (L) is at least 10 inches and the thickness is less than 0.125 inches.

14. The apparatus of claim 1, wherein the length (L) is from 11 inches to 15 inches and the thickness is from 0.01 inches to 0.006 inches.

15. An extruder system, comprising:
- the vibratory cutting apparatus of claim 1;
- an extrusion die configured to extrude an extrudate from a batch mixture; and
- wherein the vibratory cutting apparatus is positioned relative to the extrusion die to cut the extrudate into green bodies.

16. The extruder system of claim 15, wherein the extrusion die is a honeycomb extrusion die, the batch mixture is a ceramic-forming mixture, and the green bodies are green ceramic bodies.

17. A method of cutting a workpiece with the vibratory cutting apparatus of claim 1, comprising:
- vibrating the blade portion in the axial direction;
- moving the blade through the cutting stroke and through the workpiece while vibrating the blade portion; and
- exerting the fluid pressure on the opposing side surfaces of the blade portion to stiffen the blade portion as the blade portion moves through the cutting stroke.

18. The method of claim 17, wherein the fluid pressure is exerted by the set of non-contact fluid static bearings.

19. The method of claim 17, wherein the frequency of the vibrating corresponds to at least one resonance frequency of the blade portion in the axial direction.

* * * * *